March 22, 1960 — E. M. STRYKER, JR — 2,929,973
AUTOMATIC CALIBRATION FREQUENCY RESPONSIVE SERVOSYSTEM
Filed March 2, 1959
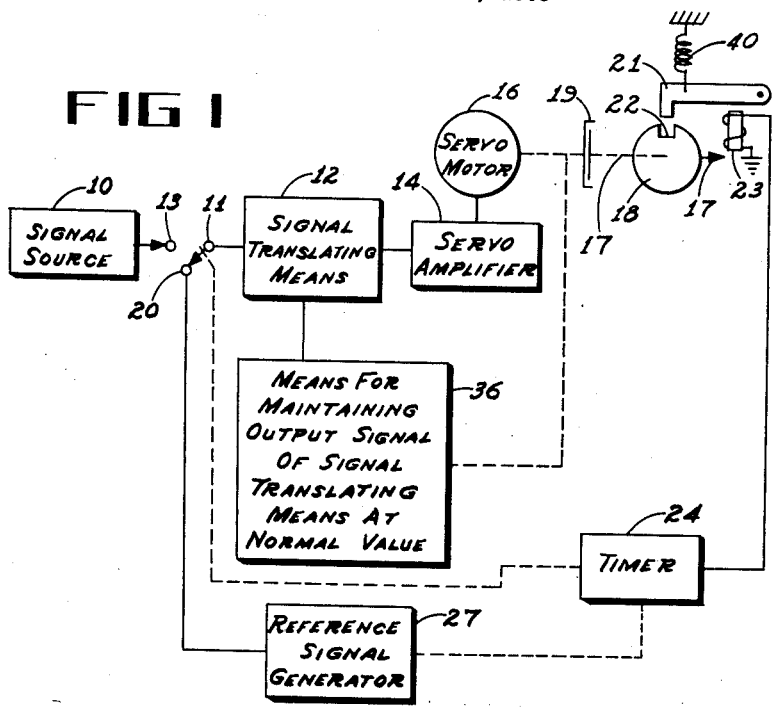
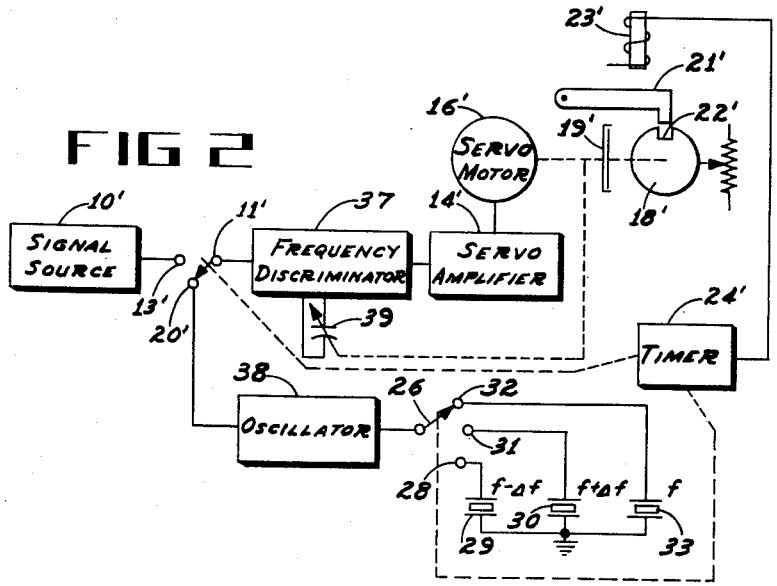
INVENTOR.
EDWIN M. STRYKER JR.
BY
ATTORNEYS ized Mar. 22, 1960

2,929,973

AUTOMATIC CALIBRATION FREQUENCY RESPONSIVE SERVOSYSTEM

Edwin M. Stryker, Jr., Marion, Iowa, assignor to Collins Radio Company, Cedar Rapids, Iowa, a corporation of Iowa Application March 2, 1959, Serial No. 796,686

5 Claims. (Cl. 318—28)

This invention relates generally to automatic calibration systems and more specifically to automatic and periodic calibration of servo systems.

In certain types of electrical apparatus there is a need for translating a particular signal, for example, an electrical signal having a particular charcteristic such a varying frequency, into a different type signal, for example an angular motion of a shaft. One manner in which this can be accomplished is through the use of a servo system. Means are provided first to translate the input signal into a D.C. signal whose magnitude and polarity are representative of the degree and direction of variation of said particular characteristic. A motor is arranged to respond to the said D.C. signal to rotate an output shaft. Mechanically coupled to this shaft is means for changing the operating characteristics of the signal translating source so that the D.C. output signal thereof always tends to remain at a value such that no torque is applied to the rotor of the servo motor. Thus, by proper design of the system, the angular position of the rotor will be representative of the variations of the particular characteristic of the applied signal being examined.

In one specific example of the prior art a signal having a variable frequency is supplied to the system. The variation in frequency can represent some particular quantity such as speed or distance. This aforementioned signal is applied to a frequency discriminator which responds thereto to produce a D.C. voltage whose amplitude and polarity are indicative of the variation of the frequency from the nominal center frequency of the discriminator. The output signal of the discriminator (a D.C. voltage) is supplied to a servo motor which responds thereto to produce in its rotor a certain angular motion. A mechanical feedback from the rotor of the servo motor to the frequency discriminator is provided whereby the nominal center frequency of a frequency discriminator is shifted towards the instantaneous frequency of the signal being supplied. Specifically this change in nominal center frequency may be accomplished by having a capacitor in the frequency discriminator circuit varied by the output of the servo motor. Thus, the angular position of the rotor of the servo motor is, at any given time, representative of the frequicy of the applied signal. However, due to changes in values of the circuit components of the frequency discriminator or due to other causes the angular position of the rotor may become maladjusted with respect to the frequency which it is supposed to represent.

It is an object of the present invention to provide means for periodically and automatically calibrating the position of the rotor of the servo motor with respect to the nominal center frequency of the frequency discriminator.

A further purpose is an inexpensive and structurally simple mechanism for adjusting the output of a servo motor with respect to an input signal to which the servo motor is responsive.

Another object of the invention is the improvement of automatic calibration systems generally.

In accordance with the invention there is provided a rotatable shaft having a notched disc secured firmly thereon and a slippable clutch means mechanically coupling said rotatable shaft to the rotor of the servo motor. There is also provided a generating means for periodically generating a reference signal and a timing means for causing said reference signal to be supplied to the signal translating source (the frequency discriminator in the specific embodiment above) at predetermined intervals of time. The said generating means is constructed to respond to the timing means to supply to the signal translating means a signal in which the aforementioned particular characteristic (such as amplitude or frequency) being measured varies over a range calculated to produce an output signal from the signal translating device whose magnitude varies from a value below a given magnitude to a value above said given magnitude and then to said given magnitude. Pawl means are provided which are responsive to the said timing means to enter the notch on said notched disc and lock said disc in a position corresponding to said given magnitude of said output signal. At the end of the calibration cycle the detent is removed from the said notch (just before and reference signal is disconnected from the signal translating means).

In accordance with one form of the invention employed in a system using a frequency discriminator the reference signal generating means can be in the form of an oscillator. The oscillator is constructed to respond to the timing means to assume first a frequency $f-\Delta f$ and then to pass through the intervening range of frequencies to a frequency $f+\Delta f$ and then to assume a final frequency of $f$, which is the calibration frequency. It is at this frequency $f$ that the nominal center frequency of the discriminator corresponds to the position of the notched disc when said disc is locked in a particular position by the pawl. During the transition of the output signal of the oscillator from $f-\Delta f$ to $f+\Delta f$ the pawl has been operated or is in an operated condition due to the timer and consequently will fall into the notch in the notched disc somewhere in this range of frequencies. Thus when the output signal of the oscillator assumes the frequency $f$ the frequency discriminator will be tuned to such frequency $f$ while the notched disc will not change its angular position due to the action of the slippable clutch. It is to be noted that the frequency discriminator can be tuned, for example, by a capacitor whose capacitance is variable in accordance with the angular position of the servo motor.

The above mentioned and other objects and features of the invention will be more fully understood from the following detailed description thereof when read in conjunction with the drawings, in which:

Figure 1 is a combination block diagram and schematic sketch of a general form of the invention; and Figure 2 is a combination block diagram and schematic sketch of a more specific form of the invention.

In the following descriptive matter corresponding elements shown in the two figures will be given similar reference characters (although primed in succeeding figures).

Referring now to Figure 1 signal source 10 functions to supply an input signal to the signal translating means 12 when the contact arm 11 is closed on contact 13. The output from the signal source 10 has some characteristic such as frequency or amplitude or phase which will vary in accordance with variations in some quantity to be measured, such as speed or distance, for example. The signal translating means 12 functions to translate the applied input signal into a D.C. signal whose magnitude and polarity are indicative of the degree and direction of variation of the particular characteristic of the input signal from a nominal value. More specifically, for example, the D.C. output signal of the signal translating means can represent the variation of frequency of the input signal above and below a given nominal frequency. The output signal from the signal translating means 12 is supplied to the servo amplifier 14 which in turn supplies its output signal to servo motor 16 which responds thereto in a well known manner to cause an angular rotation of its rotor in a direction and in an amount which will adjust the output signal of the signal translating means to have a value whereby no torque is created on the rotor of the servo motor 16. Such output signal adjusting can be performed through appropriate means, generally designated by the block 36. The block 36 could be, for example, a variable resistive means if the particular characteristic of the input signal being examined is amplitude or alternatively the structure within the block 36 could be a variable capacitor or a variable inductor if the particular characteristic being examined happens to be frequency. In either case the resultant angular position of the rotor of the servo motor is representative of the polarity and the magnitude respectively of the instantaneous value of the particular characteristic being measured of the applied input signal.

Now if the system were completely accurate the angular rotation of the rotor of the servo motor could be employed to drive a suitable load without any means for correcting or periodically calibrating the accuracy of the system. However, such is not the case inasmuch as maladjustments of the system do occur. In order to provide for periodic corrections of these errors, the circuitry described in the following paragraphs is employed, said circuitry forming the essence of the invention.

A rotatable shaft schematically designated by the dotted line 17 has a notched disc 18 mounted concentrically therein. The rotatable shaft 17 is coupled mechanically to the rotor of the servo motor 16 by means of a slippable clutch 19. When the pawl 21 is caused to move against the periphery of the notched disc 18 due to energization of the electromagnetic means 23 by a signal from the timer 24, the notched disc 18 can rotate until the pawl and the notch 22 become aligned, at which time they will mesh, thus preventing further rotation of the disc 18. The time relationship of the operation of the pawl 21 with respect to the other portion of the calibrating circuit will be discussed below.

At the same time the pawl 21 is caused to move against the perimeter of the notched disc 18, the timer 24 also will cause the contact arm 13 to make with contact 20 and further will cause the reference signal generator 27 to go through a particular cycle of operation; which cycle of operation lasts for a fraction of a second and which involves three steps. In the first step the reference signal generator 27 produces an output signal in which the particular characteristic being measured has a value less than a given value. In the second step the reference signal generator produces a signal in which the particular characteristic has a value above said given value. In the third step the reference signal generator produces a signal in which the particular characteristic has a value equal to said given value. Between the first and second steps the rotor of the servo motor 16 is caused to rotate through a certain angular distance whereby the notch 22 of the disc 18 is caused to pass under the pawl 21 which thereupon enters the notch and locks the disc 18. The structure is so designed that the disc 18 is locked in an angular position which corresponds to the particular characteristic having said given value. Thus when the third and last step of the operational cycle in the reference signal generator occurs, the rotor of the servo motor 16 will respond thereto to assume an angular position corresponding to the particular characteristic having said given nominal value. It is to be noted that the rotor of the servo motor 16 can rotate even though disc 18 is locked due to slippable clutch 19. Since the disc 18 is locked by pawl 21 during this third step, the rotatable shaft 17 is now calibrated correctly with the particular characteristic of said given value. At the end of the aforementioned third step, the timer 24 functions to open the contact 20 and to close the contact arm 11 upon contact 13, to de-energize the relay winding 23 so that the pawl 21 is removed from the notch 22 by the tension spring 40. It is to be noted that the pawl 21 must be removed from the notch 22 before the swinger arm 11 makes with the contact 13.

The timer as indicated supra will function periodically to initiate the calibration process at predetermined intervals of time.

Referring now to Figure 2 there is shown a preferred specific form of the invention. A signal is supplied from the signal source 10' to the frequency discriminator 37 through the contact 13' and arm 11'. The applied input signal has a frequency which is representative of the speed or distance. The frequency discriminator 37 responds to the supplied input signal to produce a D.C. output signal whose polarity and amplitude are representative of the polarity and magnitude of the frequency deviation about the nominal center frequency of the discriminator. Such D.C. signal is amplified by the servo amplifier 14' and is supplied to the servo motor 16'. The servo motor 16' will respond to this D.C. signal amplification, to vary the capacitor 39 in such a manner as to cause the center frequency of the discriminator to coincide with the varying frequency of the applied input signal. When coincidence is obtained there no longer will be a D.C. output from the frequency discriminator 37 and the rotor of the servo motor 16' will no longer have a torque applied thereto. Thus the angular position of the rotor of the servo motor is representative of the instantaneous center frequency of the discriminator which in turn is representative of the frequency of the applied input signal.

In order to calibrate the system periodically there is provided, as discussed in connection with the structure of Figure 1, a clutch 19', a notched disc 18' having a notch 22' therein, a pawl 21', and an electromagnetic device 23' for actuating the pawl. At the beginning of each calibrating cycle the timer 24' functions to actuate the electromagnetic device 23' to actuate the pawl 21' against the perimeter of the notched disc 18'.

Also actuated by the timer 24' is the arm 11', which is caused to make with contact 10', whereby the output signal of the oscillator 17' is supplied to the frequency discriminator 37. Also at this time the arm 26 associated with the oscillator 27, is caused to make, successively, with contacts 28, 31', and 32. More specifically when the timer 24' initiates the calibration process, arm 26 is caused to make with the contact 28 which functions to connect the crystal 29 into the oscillator circuit 38 to cause the oscillator to produce an output signal having a frequency $f - \Delta f$. A short interval of time later the arm 26' is caused to break with contact 28 and to make with contact 31 thus connecting the crystal 30 into the oscillator circuit to cause said oscillator to produce an output signal having a frequency equal to $f + \Delta f$. After another short interval of time the arm 26 breaks with contact 31 and makes with contact 32 to connect the crystal 33 to the oscillator circuit 38 to cause said oscillator circuit to produce an output signal having a frequency $f$.

It is to be noted that during the time interval the arm 26 makes with the contacts 28, 31 and 32 and for a short interval of time thereafter, the electromagnetic device 23 also is energized and the arm 11' makes with contact 10'.

When the arm 26 passes from contact 28 to contact 31, the rotor of the servo motor 16' will be caused to rotate through a certain angular distance because of the different frequencies ($f - \Delta f$ and $f + \Delta f$) supplied to the frequency discriminator 37 from the oscillator 33. Such angular distance is sufficient to insure that the notch 22' of the disc 18' will pass under the pawl 21 and will be engaged thereby, thus preventing further rotation of the disc 18'.

When the arm 26 makes with contact 32 the servo motor will respond to the output of the oscillator 38 to adjust the capacitor 38 so that the center frequency of the frequency discriminator 37 will coincide with the frequency $f$. Since the angular position of the notched disc 18' is at this time locked in an angular position corresponding to the frequency $f$ it can be seen that the output of the system measured in terms of angular rotation is now calibrated with the frequency discriminator.

At the end of the calibration period the timer 24' automatically de-energizes the electromagnetic winding 23' and switches the arm 11' to make with the contact 13'. After a given interval of time the timer will again initiate the calibration process.

It is to be noted that the forms of the invention shown and described herein are but preferred embodiments thereof and that various changes may be made in circuit arrangement and that it, the invention, may be employed with other signal characteristics without departing from the spirit or scope thereof.

I claim:

1. In a system for changing an electrical signal into a mechanical signal comprising first means for receiving an electrical signal having a particular characteristic, second means responsive to said electrical signal to produce a D.C. signal whose magnitude and polarity are representative of the degree and direction of said particular characteristic from a given value, third means for adjusting said second means to cause said D.C. signal to vary, and servo means constructed and arranged to be responsive to said D.C. signal to adjust said third means so that said D.C. signal is caused to assume a predetermined value, calibrating means for calibrating said servo means with said particular characteristic, said calibrating means comprising rotatable shaft means, mechanical means constructed when actuated to cause said rotatable shaft means to become locked in a predetermined angular position corresponding to a given value of said particular characteristic, clutch means for connecting said rotatable shaft means to said servo means, reference signal means constructed when actuated to produce firstly a signal having said particular characteristic with a magnitude on one side of said given value, secondly, a signal having said particular characteristic with a magnitude on the other side of said given value, and thirdly, a signal having said particular characteristic with said given value, switching means constructed when actuated to supply the output signal of said reference signal means to said second means, and timer means for substantially simultaneously actuating said mechanical means, said reference signal means, and said switching means.

2. A system in accordance with claim 1 in which said second means comprises a frequency discriminator, in which said third means comprises a reactor, and in which said reference signal means comprises an oscillator means and switching means for consecutively causing the oscillator means to produce firstly an output signal having a frequency on one side said given value, secondly to produce an output signal having a frequency on the other side of said given value and thirdly to produce an output signal having a frequency at said given value.

3. A system in accordance with claim 2 in which said mechanical means comprises a disc having a notch therein and mounted on said rotatable shaft means, and pawl means constructed when actuated to engage the notch in said notched disc to lock said notched disc in a predetermined angular position corresponding to said given value of said particular characteristic.

4. In a system for changing an electrical signal into a mechanical signal comprising first means constructed to be responsive to an electrical signal having a particular characteristic to produce a D.C. signal whose magnitude and polarity are representative of the degree and direction of said particular characteristic from a given value, second means to cause said D.C. signal to vary independently of the particular characteristic of said electrical signal, and servo means constructed and arranged to be responsive to said D.C. signal to adjust said second means so that said D.C. signal is caused to assume a predetermined value, calibrating means for calibrating said servo means with said particular characteristic, said calibrating means comprising rotatable shaft means, notched disc means mounted on said rotatable shaft, slippable clutch means connecting said rotatable shaft means to said servo means, pawl means constructed when actuated to engage said notched disc, reference signal means construced when actuated to produce firstly a signal having said particular characteristic with a magnitude on one side of said given value, secondly, a signal having said particular characteristic with a magnitude on the other side of said given value, and thirdly, a signal having said particular characteristic at said given value, first switching means constructed when actuated to supply the output signal of said reference signal means to said first means, and timer means for substantially simultaneously actuating said pawl means, said reference signal means, and said first switching means.

5. A system in accordance with claim 4 in which said first means comprises a frequency discriminator, in which said second means comprises a reactive element, and in which said reference signal means comprises an oscillator and second switching means constructed when actuated to cause said oscillator to produce in the time order as follows, an output signal having a frequency on one side of said given value, an output signal having a frequency on the other side of said given value, and then an output signal having a given frequency at said given value.

No references cited.